United States Patent [19]
Morris et al.

[11] 3,754,182
[45] Aug. 21, 1973

[54] SWITCHING VOLTAGE REGULATOR WITH INPUT LOW VOLTAGE AND OUTPUT VOLTAGE DETECTORS

[75] Inventors: David Morris, Brooklyn, N.Y.; Donald Conti, Ridgefield, N.J.

[73] Assignee: Litton Business Systems Inc., Orange, N.J.

[22] Filed: Oct. 2, 1972

[21] Appl. No.: 294,277

[52] U.S. Cl................... 323/17, 307/290, 307/297, 317/31, 323/DIG. 1, 323/22 T
[51] Int. Cl........................... G05f 1/56, G05f 5/00
[58] Field of Search................... 323/4, 9, 17, 22 T, 323/DIG. 1; 317/31, 33 R, 33 VR; 307/297, 290

[56] References Cited
UNITED STATES PATENTS

| | | | |
|---|---|---|---|
| 3,125,715 | 3/1967 | Brooks | 323/22 T |
| 3,391,330 | 7/1968 | Grossoehme | 323/9 |
| 3,497,794 | 2/1970 | Fredrickson et al. | 323/DIG. 1 |
| 3,538,421 | 11/1970 | Young | 323/22 T X |
| 3,707,635 | 12/1972 | Kawashima | 307/297 |

*Primary Examiner*—Gerald Goldberg
*Attorney*—Norman Friedman et al.

[57] ABSTRACT

A constant potential power supply having a Schmitt trigger regulator and switching amplifier to maintain the output load voltage within a predetermined range, and an undervoltage protection circuit which disables the regulator when the input potential goes below a predetermined level. An integrating capacitor which is part of the Schmitt trigger regulator, discharges through the load. The Schmitt trigger regulator is actuated when the output potential decreases below a certain maximum value and is disabled as the output potential goes below a certain minimum value; it is also actuated when the output potential increases to this minimum value and is disabled as the output potential goes below this maximum value. After actuation and until disabled, charging current is applied to the capacitor. The switching amplifier circuitry, which is coupled to the output load and the regulator, enables and disables the line switch of the regulator when the output voltage increases to this minimum value and when it decreases below this same minimum value. The output triggering section of the regulator disables the line switch when the output voltage increases above this maximum value and when it decreases below this same maximum value. The particular arrangement between the switching amplifier and the regulator provides significant control of the hysteresis as well as decreasing it and improving the overall regulation of the circuit.

10 Claims, 9 Drawing Figures

3,754,182

SWITCHING VOLTAGE REGULATOR WITH INPUT LOW VOLTAGE AND OUTPUT VOLTAGE DETECTORS

BACKGROUND OF THE INVENTION

Voltage regulators of the switching type have been developed but these have shortcomings which affect their usefulness. These devices usually employ a circuit such as a Schmitt trigger which is utilized to detect the variation in the output potential and in turn control an electronic switch which selectively interconnect an unregulated direct potential source with a potential integrator. The constancy of potential provided is dependent upon the variation of the output potential and the voltages at which the controlled electronic switch is actuated into conduction and cut off. The smaller this variation the more nearly constant is the output potential. This variation, referred to as "hysteresis" is the main factor in obtaining good regulation and heretofore has been rather difficult to simply control and reduce. Furthermore, such switching regulators often utilized relatively complex circuits for protecting against the potential source decreasing below a certain value which could affect its length of operation.

SUMMARY OF THE INVENTION

It is, therefore, an object of this invention to provide an improved voltage regulator circuit whose hysteresis magnitude can be controlled.

Another object of this invention is to provide an improved voltage regulator circuit having excellent regulation characteristics.

A further object of this invention is to provide an improved voltage regulator circuit which achieves a lower hysteresis.

A still further object of this invention is to provide an improved voltage regulator circuit which will protect and increase the life of the battery used to provide the input voltage.

These and other objects of the present invention are accomplished in the illustrative embodiment by providing a Schmitt trigger regulator circuit which is fed by a battery supply voltage. The regulator circuit comprises a Schmitt trigger amplifier having a first and second triggering stage, and an output voltage detector. The output voltage detector is coupled to and provides control signals to both the second triggering stage and to a switching-amplifier. Both the second triggering stage and the switching-amplifier are connected to and control the first triggering stage which initiates and terminates the regulator's power stroke. As the output voltage increases to a certain minimum value the switching-amplifier is turned OFF. This causes the first triggering stage to switch ON thereby initiating the power stroke. When the output voltage increases to the maximum value it is now sufficient to turn ON the second triggering stage which triggers the first stage to its OFF condition and ends the power stroke. When the output voltage decreases below this same maximum value the second triggering stage returns to its OFF condition thereby triggering the first stage ON to initiate another power stroke. When the output voltage decreases to below the minimum value it is fed back to the switching-amplifier to turn it ON thereby switching OFF the first stage and terminating this power stroke.

DESCRIPTION OF THE INVENTION

Figure 1:
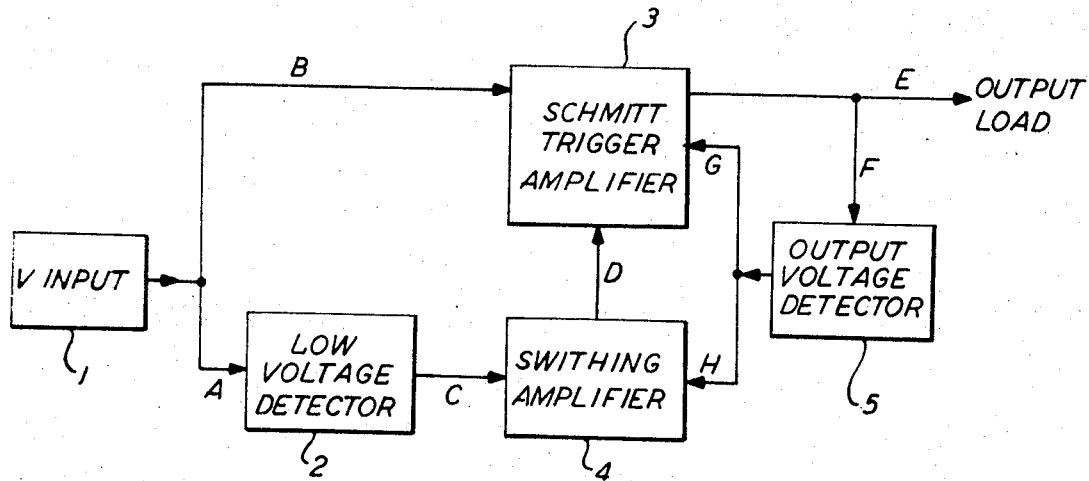
FIG. 1 is a simplified functional block diagram of a circuit incorporating the features of this invention.

Referring to FIG. 1 which is a simplified functional block diagram of the invention, a voltage source 1, referred to as V-INPUT, which may be a 6-volt DC source, is coupled at its output over line A to the input of a low voltage detector means 2 as well as to the input of the amplifier portion 3 of a conventional Schmitt trigger regulator, over line B. The output of the low voltage detector means 2 is coupled over line C to one control terminal of a switching amplifier 4. The switching amplifier's output is in turn coupled over line D to a first control terminal of the Schmitt trigger amplifier 3. The output of the Schmitt trigger amplifier 3 is coupled over line E to an output load (not shown) and over line F to the input of an output voltage detector 5 which is another section of the Schmitt trigger regulator. The output of the voltage detector 5 is then coupled to the second control terminal of the Schmitt trigger amplifier 3 over line G as well as to a second control terminal of said switching amplifier 4 over line H.

Figure 2:
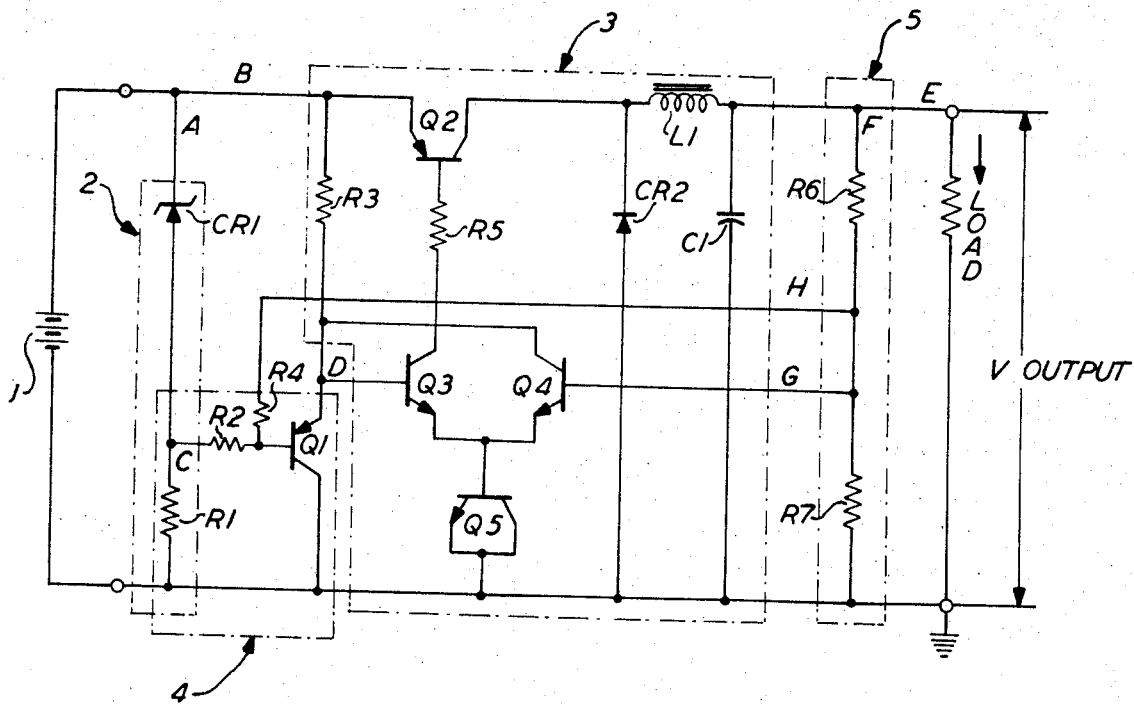
FIG. 2 is a schematic diagram of the invention illustrated in the embodiment of FIG. 1.

Referring now specifically to the detailed schematic embodiment of the invention in FIG. 2, one side of a DC input voltage source 1 is coupled over line A to the cathode of a zener diode CR1 of the low voltage detector 2; its anode is coupled to one end of a bias resistor R1. The other end of resistor R1 is coupled to the other side of the DC input voltage source 1, ground. The zener diode CR1 together with resistor R1 provide detection of a low input voltage coupled over line A, that is when the magnitude of the input voltage from voltage source 1 is below a first predetermined value. The output from the low voltage detector 2 is then coupled over line C, through bias resistor R2, to the base of a PNP transistor Q1 of switching amplifier 4. Additional biasing thereto is provided by resistor R3 which is coupled at one end to the emitter of a series PNP transistor Q2 and at its other end to the emitter output of transistor Q1. One end of a feedback resistor R4 of switching amplifier 4 is coupled to the base of transistor Q1; its other end is coupled over line H to the output of an output voltage detector 5. The Schmitt trigger regulator utilized in the circuit is conventional, and consists of two sections, an amplifier portion, referred to as a Schmitt trigger amplifier 3, and an output voltage detection section 5. The amplifier portion includes the series PNP transistor Q2 whose emitter is coupled over line B to the input voltage source 1 as well as to one end of bias resistor R3. The base of series transistor Q2 is coupled through another biasing resistor R5 to the output of a first triggering circuit which includes a first triggering NPN transistor Q3. The base of the first triggering transistor Q3 is coupled to the emitter output of transistor Q1 over line D as well as to one end of bias resistor R3 and to the collector of the second triggering circuit which includes a second NPN triggering transistor Q4. Both emitters of the triggering transistors Q3 and Q4 are directly coupled together and are joined to the base of a transistor Q5 which operates as a diode, its collector and emitter being short circuited to ground. The collector of series transistor Q2 is coupled, at its output, to the input end of a choke L1 as well as to a free wheeling diode CR2. The output end of the choke L1 is coupled to a storage capacitor C1 whose other end is grounded. Additionally, the output end of choke L1 is coupled over line F to the output voltage detecting circuit 5. This output voltage detecting circuit 5 includes a first sensing resistor R6, one end of which is connected to the output end of the choke L1 and the other end of which is coupled to one end of a second series connected sensing resistor R7, which is in turn coupled to ground. The junction of sensing resistors R6 and R7 are in turn coupled to the base of the second triggering transistor Q4 over line G, as well as to one end of feedback resistor R4 in the switching amplifier circuit 4 over line H. When the voltage across the output detector 5 is greater than a second predetermined value, the feedback voltage applied to transistor Q1 will switch it from a conducting state to a non-conducting state. Furthermore, when the voltage across the output detector 5 is greater than a third predetermined value the voltage across resistor R7 will bias the second triggering transistor Q4 into conduction; when the output detector voltage is less than this third predetermined value, Q4 will be non-conducting. The first triggering transistor Q3, and the transistor it controls, series transistor Q2, will only conduct if both the second triggering transistor Q4 and the switching amplifier's transistor Q1 are non-conducting. Finally, the junction between the inductor L1 and storage capacitor C1 are coupled to the load and its other end is coupled to ground.

Referring now to FIG. 1, the undervoltage operation will first be described. The DC input voltage 1 is applied to the regulator circuit over lines A and B. When the magnitude of the DC input voltage is less than a first predetermined value, which magnitude depends on the particular design of the regulator (i.e., the type of batteries used and their voltage magnitude), this voltage will be detected by the low voltage detector 2. This low voltage detector 2 responds to input voltage signals below the first predetermined value to provide an output signal over line C to a first control terminal of switching amplifier 4 to turn the switching amplifier 4 ON. This switching amplifier 4 will respond to such an output signal to provide an output control signal over line D to the first control terminal of Schmitt trigger amplifier 3. This signal to the Schmitt trigger amplifier 3 will turn it OFF thereby disconnecting the DC input voltage 1 from the output load normally supplied over line E. In this condition the regulator circuit will be operating in its undervoltage protection mode which will protect and increase the life of the battery, as if the battery voltage was reduced below the first predetermined level and a load was continuously on the battery, its life could be greatly reduced. This solid state battery cut-off circuit will automatically reset if the battery voltage goes above this first predetermined level as will be explained hereinafter.

Referring again to FIG. 1, in the regulation mode of operation, the magnitude of the input voltage 1 will be greater than the first predetermined value and will be detected by the low voltage detector 2; accordingly a different output signal will be developed over line C which when applied to the input of the switching amplifier 4 will be sufficient to turn if OFF. The control signal developed over line D as a result of the switching amplifier 4 being turned OFF will in turn be sufficient to put the Schmitt trigger amplifier 3 in such condition as to allow current from input voltage source 1, over line B, to be transmitted through it to the load over line E.

Figure 7:
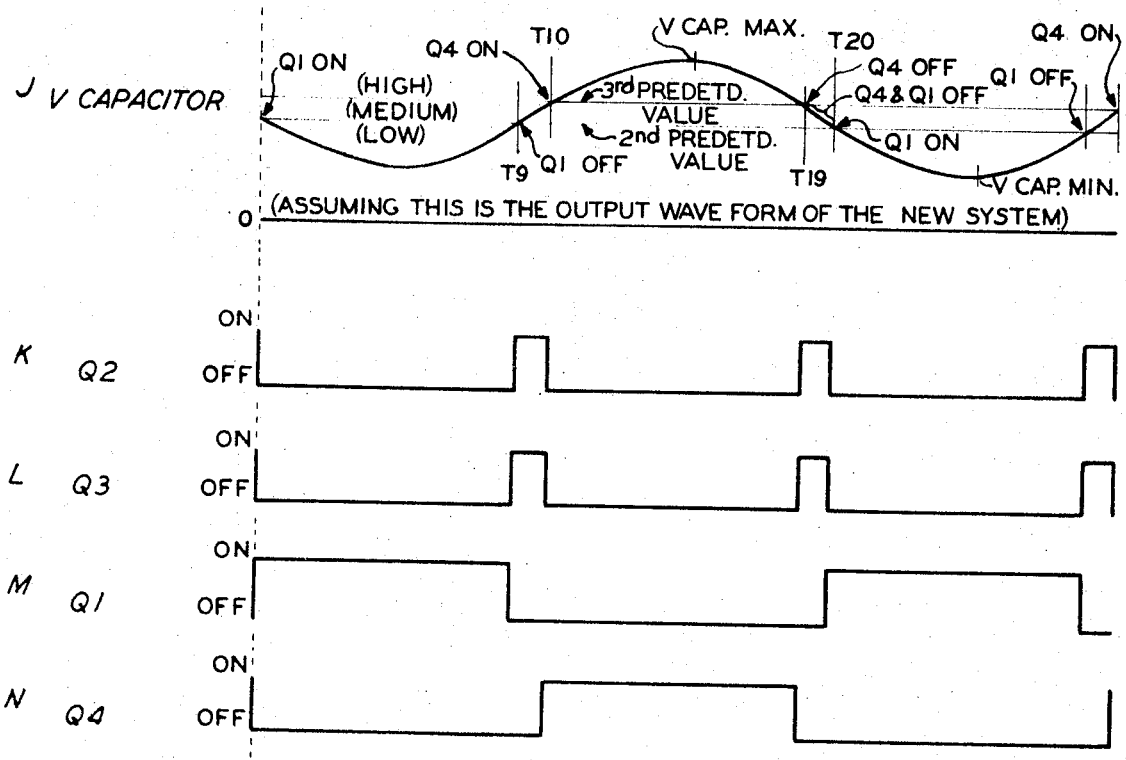
FIG. 7 is a series of waveforms useful in explaining the operation of the embodiment of FIG. 2.

Still referring to FIG. 1 and the waveforms shown in FIG. 7, the regulation action, in a simplified manner, will be described. In order to properly analyze the regulating operation of this circuit the output waveform, represented by curve "J," FIG. 7, must be considered as the referece voltage. This output voltage is referred to as "V capacitor"; it is the same as the voltage across storage capacitor C1. When the output voltage across the load is less than a second predetermined magnitude (i.e., 5.3 volts) a "low" input signal will be coupled over line F to the output voltage detector 5, which detector will be responsive to such signal, to provide at its output, a "low" control signal over line H to the second control terminal of the switching amplifier 4. This "low" control signal's amplitude is small enough to turn the switching amplifier 4 ON which in turn provides a control signal to the first terminal of the Schmitt trigger amplifier 3 sufficient to disable it. This cuts off the flow of current from the input source 1 to the load. Simultaneously, this same " low" control signal from the output detector 5, is coupled over line G to the second control terminal of Schmitt trigger amplifier 3, which will not respond thereto as the magnitude of this "low" control signal is less than that required to trigger ON one of the triggering sections (the second) of the Schmitt trigger amplifier 3.

When the output voltage across the load exceeds the second predetermined magnitude, the input signal coupled over line F to the output voltage detector 5, which detector will be responsive to such a second predetermined value, to provide, at its output, a "medium" output control signal over line H to the second control terminal of the switching amplifier 4 which is sufficiently larger to cut it OFF. The switching amplifier 4 will then provide, over line D, a control signal to the first control terminal of Schmitt triggering amplifier 3 to turn ON the first triggering section. At this point it is important to note that this action can only occur if the second triggering section of the Schmitt trigger amplifier 3 was itself OFF; if the second section was ON it would disable the Schmitt trigger amplifier 3. When the first triggering section of the Schmitt trigger amplifier 3 is turned ON the Schmitt trigger amplifier 3 will allow passage of current therethrough from input voltage source 1 to the load. When the voltage across the output load increases, to a third predetermined value (i.e., 5.35 volts), the output detector 5 responds thereto by providing a "high" output signal over line G to the second control terminal of the Schmitt trigger amplifier 3 which is now sufficient to turn its second triggering section ON, which then turns the first section OFF thereby cutting off the flow of current from intput voltage 1 to the output. This same "high" output signal is also coupled over line H to the second control terminal of switching amplifier 4, which will not respond thereto to provide an output signal over line D to the first control input terminal of Schmitt trigger amplifier 3, since the magnitude of the "high" output signal is still too high to turn the switching amplifier 4 ON. When the output voltage across the load has decreased below the third predetermined value (i.e., 5.35 volts) a "medium" output signal from the output detector 5 will be coupled over line H to the second control terminal of switching amplifier 4. Since the amplitude of this signal is still too high to turn the switching amplifier 4 ON, it will be maintained in its previous OFF condition. However, while the switching amplifier 4 is in the OFF condition it will enable the first triggering section of the Schmitt trigger amplifier 3 to be turned ON by the output signal coupled over line G to the second control terminal of the Schmitt trigger amplifier 3, as the signal's magnitude is now insufficient to maintain the second triggering section ON, thereby turning it, the second triggering section, OFF resulting in the first triggering section being turned ON. When the first triggering section is turned ON it simultaneously turns the Schmitt trigger amplifier 3 itself ON thereby allowing current to flow from the input voltage source 1 to the load. Finally when the output voltage across the load decreases below the second predetermined value a "low" output signal at the output of output detector 5 is coupled over line H to the second control terminal of the switching amplifier 3 which is now small enough to turn ON this circuit, which in turn provides an output signal to the first triggering section of Schmitt trigger amplifier 3 to disable it and to turn it OFF thereby simultaneously turning the Schmitt trigger amplifier 3 itself OFF and interrupting the current flow from the input voltage source 1. Since the magnitude of this same output signal from the output detector 5, coupled to the second terminal of the Schmitt trigger amplifier 3, is lower than that required to turn its second triggering section ON, it is maintained OFF. Thus, the cycle continues to repeat unless the magnitude of the input voltage 1 is less than the first predetermined voltage set in the low voltage detector means 2 which provides the undervoltage protection to protect the batteries used as the input voltage source 1.

Figure 3:
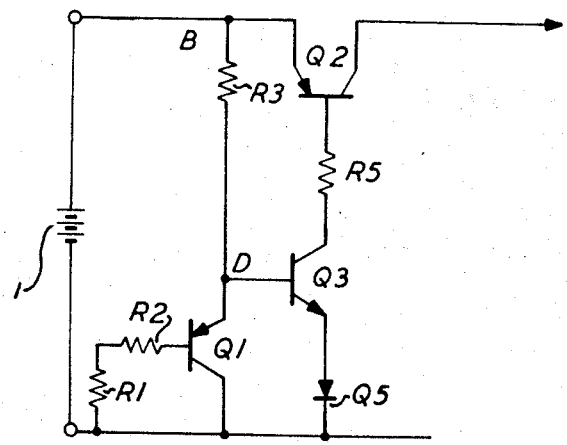
FIG. 3 is a partial, simplified schematic diagram of the invention illustrated in the embodiment of FIG. 2, in the undervoltage mode of operation.

Referring generally now to FIG. 2 and particularly to FIG. 3, the undervoltage mode of operation will be described in detail. When the magnitude of the input DC voltage 1 is below the first predetermined voltage, the firing voltage of the zener diode CR1 of low voltage detection circuit 2, the switching amplifier's transistor Q1 will be heavily biased into conduction due to base drive through biasing resistors R1, R2, and R3. Relatively no current will flow through the zener diode CR1. The equivalent circuit of the front end of this system in this mode can thus be illustrated as in FIG. 3. As transistor Q1 is driven into conduction it will in turn force the base of the first triggering transistor Q3 of the Schmitt trigger amplifier 3, which is coupled to the output of switching amplifier 4, to be at the saturation voltage of the collector emitter of transistor Q1. Since this voltage is below that which would be required to drive triggering transistor Q3 into conduction, it would therefore eliminate the necessary base drive required to turn ON series transistor Q2. Thus, series transistor Q2 will be cut off, thereby disabling the Schmitt trigger amplifier 3 which prevents any current from flowing from voltage source 1 to the load. This protects the batteries from further discharge which would otherwise damage them.

Figure 4:
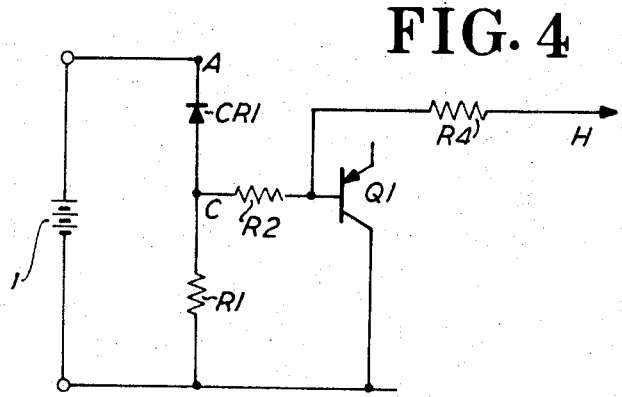
FIG. 4 is a partial, simplified schematic diagram of the invention illustrated in the embodiment of FIG. 2, in the regulating mode of operation.

Referring generally now to FIG. 2 and particularly to FIG. 4, when the magnitude of the input voltage from input voltage source 1 increases above the first predetermined voltage, the firing voltage of zener diode CR1, the system will operate in its regulating mode. In this regulation mode the zener diode CR1 will break down, thereby substantially increasing the current passing through resistor R1. The equivalent circuit of the front end of this system in this mode can thus be illustrated as in FIG. 4. The more positive signal developed at the output of low voltage detector 3, a positive base signal across biasing resistor R1, is coupled to transistor Q1's base and will initially turn conducting transistor Q1 OFF. This action will in turn increase the positive voltage applied to the base of the first triggering transistor Q3 and turn it ON; this of course will then result in series transistor Q2 being turned ON thereby allowing current to flow through it to choke L1, capacitor C1, and to the output load. Additionally a portion of the output voltage across the load and output voltage detector 5 is fed back to the switching amplifier 4 over line H to the base of transistor Q1 resulting in a greater positive base signal being applied to transistor Q1 thereby further tending to turn it OFF. In the switching amplifier circuit 4, the magnitude of resistor R2 is quite important in that the switching amplifier 4 can be made to operate in a hysteresis type turn on-off circuit or operate in a linear type turn on-off circuit. The type of operation of the switching amplifier 4 is further influenced by the magnitude of resistor R1; if resistor R1 is large, a sharp hysteresis will result, whereas if the magnitude of resistor R1 is small, substantially no hysteresis will be observed.

Figure 5:
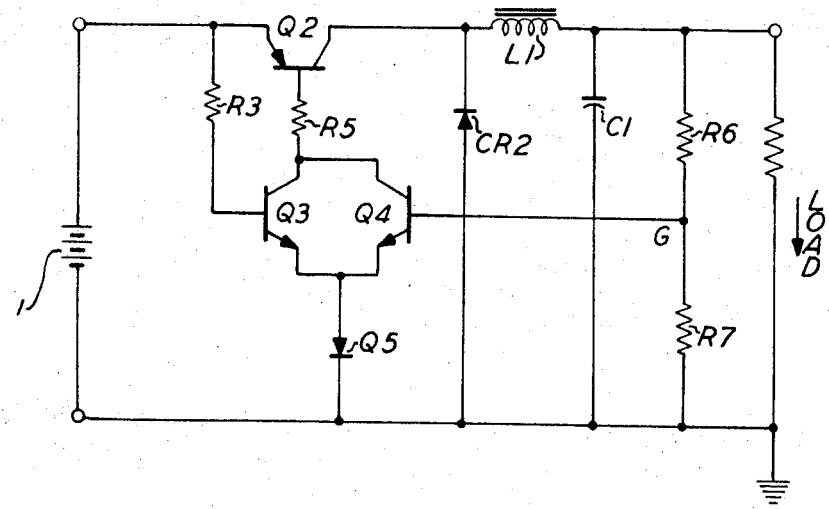
FIG. 5 is a schematic diagram of a conventional Schmitt trigger regulator.
Figure 6:
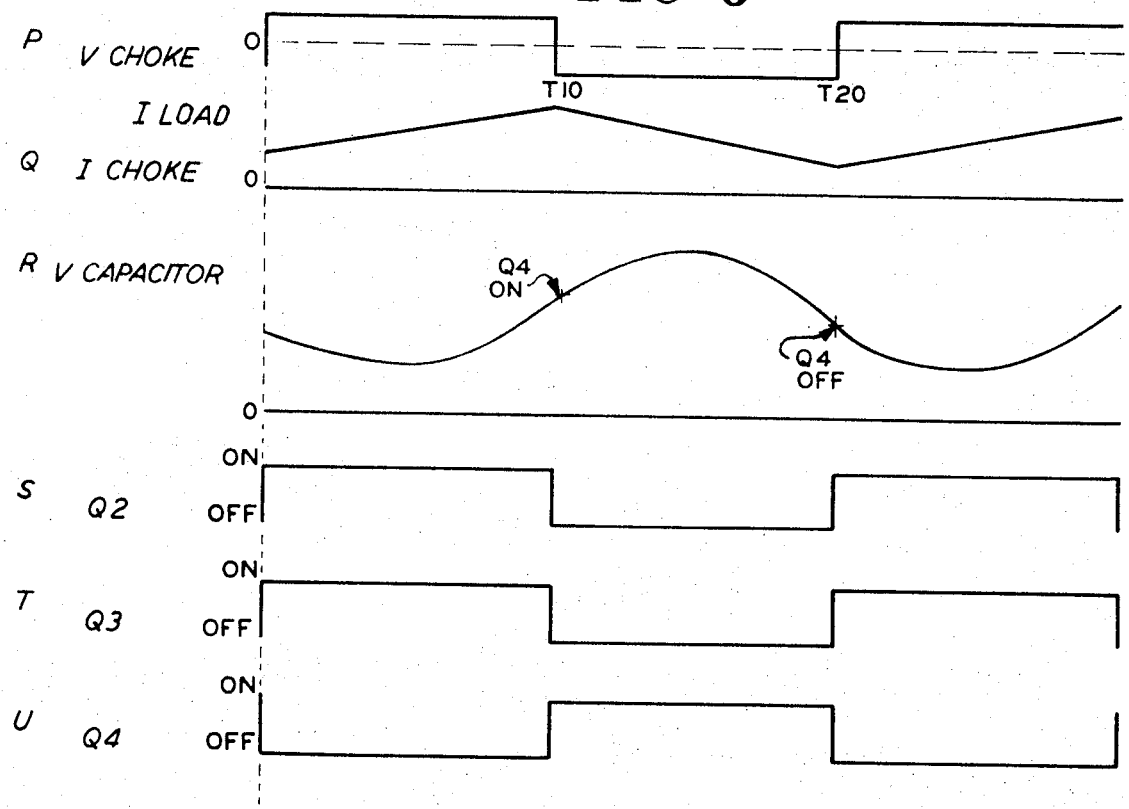
FIG. 6 is a series of waveforms useful in understanding the operation of the circuit of FIG. 5.

To more fully understand and appreciate the invention specific reference is now had to FIGS. 5 and 6 wherein a conventional Schmitt trigger regulator and the waveforms associated therewith are shown. In operation when an input voltage 1 is applied thereto, first triggering transistor Q3 conducts as a result of the base drive through bias resistor R3; this transistor Q3 then turns ON series transistor Q2, the latter allowing current to pass from the input voltage source 1 through inductive coil L1 to the output load. As the first triggering transistor Q3 conducts, it drives the second triggering transistor Q4 OFF. This action between these two triggering transistors is complementary in this circuit; they are alternately ON and OFF, and at any given time they are always in opposite states of conduction. The current passing through transistor Q2 also charges up storage capacitor C1. When the output voltage increases so that the voltage across a sensing resistor R7 of the output voltage detector is greater than the sum of diode voltage of Q5 and the base to emitter voltage of transistor Q4 (i.e., 5.40 volts), at time T10 this second triggering transistor Q4 will conduct thereby bypassing the base drive circuit of the first triggering transistor Q3 to drive transistor Q3 OFF.

This will result in series transistor Q2 being turned OFF. As a result of this, inductor L1 will then supply current through the free wheeling diode CR2 to the load and storage capacitor C1. When the inductive energy of L1 decreases to a certain point capacitor C1 will then take over and start to discharge through the load. The output voltage, however, will continue to decrease, and, as it decreases, the base drive through triggering transistor Q4 will also decrease, eventually turning it off (i.e., at 5.30 volts) at time T20; such action will turn triggering transistor Q3 ON thereby turning series transistor Q2 back ON and allowing it to again conduct, hence the cycle will repeat. It should be noted that in this conventional circuit the state of the triggering transistors are always opposite to each other.

Referring again to FIG. 2 and the waveforms shown in FIG. 7, the regulation action will now be described in a more detailed manner. Again it is emphasized that in order to properly understand the regulatory operation of this circuit the output waveform represented by curve "J," FIG. 7, must be considered as the reference voltage. At a time prior to T9 the output voltage ("V capacitor") is less than the second predetermined value. Therefore the "low" control signal supplied to transistor Q1 from the output voltage detector 5 over line H is sufficiently low to maintain this transistor ON. Further, the "low" control signal which is simultaneously coupled over line G from this same output voltage detector 5 to the second triggering transistor Q4, is not sufficiently high to turn transistor Q4 ON; thus during this time interval prior to at least time T9 it will be OFF. However, since transistor Q1 is in an ON condition it will, in that state, control the state of the first triggering transistor Q3, and when it is in the ON condition it will drive transistor Q3 OFF, which will cut off series transistor Q2 thereby disconnecting the load from the input source voltage. At time T9 the magnitude of the output voltage has increased to the second predetermined value. When this magnitude is reached a "medium" control signal is coupled over line H from the output voltage detector 5 to the base of transistor Q1, the magnitude of which is now sufficiently positive to drive it into non-conduction, the OFF state. As transistor Q1 is driven into non-conduction it provides an output control signal over line D to the base of the first triggering transistor Q3 which is sufficient to turn it ON. This action of transistor Q3 being turned ON provides the required base drive to switch series transistor Q2 ON resulting in a power stroke, current from the input voltage source 1 being coupled through it toward the load. The state of the second triggering transistor Q4 does not change, since during this time interval (between time T9 and prior to time T10) the output voltage is not sufficiently positive to provide a large enough control signal from the output voltage detector 5 over line G to turn ON this transistor Q4.

However, when the output voltage increases to the third predetermined value, at time T10, this "high" control signal from the output voltage detector 5 to the second triggering transistor Q4 over line H is now sufficiently positive to turn it ON. This action results in this second triggering transistor Q4 driving the first triggering transistor Q3 OFF which in turn switches OFF series transistor Q2, thus ending the power stroke. When the output voltage decreases below the third predetermined value at time T19 the magnitude of the control signal applied to the second triggering transistor Q4 over line H from the output voltage detector 5 is insufficient to maintain it ON and therefore transistor Q4 turns OFF. This action results in the first triggering transistor Q3 being driven ON thereby switching series transistor Q2 ON again starting another power stroke. The control signal applied to transistor Q1 over line H during the interval prior to time T20 is sufficiently positive to maintain it in the OFF condition. In this OFF state transistor Q1 will not control the state of the first triggering transistor Q3. However, when the output voltage across the load decreases further, to below the second predetermined value at time T20, the control signal coupled to transistor Q1 over line H is no longer sufficiently positive to maintain it OFF; therefore it conducts and drives the first triggering transistor Q3 OFF thereby switching OFF series transistor Q2 and ending the power stroke. The state of the second triggering transistor Q4 is unaffected by this change in output voltage as the magnitude of the control signal coupled to it over line G is now even much less than before and less than required to turn it ON; thus, it stays in the OFF condition.

It is quite important to note, though apparent from the above, that transistor Q1 becomes part of the Schmitt trigger action of the regulator thereby increasing the overall gain of the circuit resulting in better regulation.

The previous description of the operation of the circuit illustrated in FIG. 2 is a simplified one and sufficient for a general understanding of the circuits nature and operation, but neglects the hysteresis effects of both transistors Q1 and Q4. To more fully understand the details of the operation of this circuit and the hysteresis effects of transistor Q1 and Q4, reference may be had to the waveform of FIG. 8 which is an expanded view of waveform J of FIG. 7. A detailed understanding of the operation of the circuit should be clear from the waveform of FIG. 8 and the previous description of the operation of the invention illustrated in FIG. 2.

Figure 9:
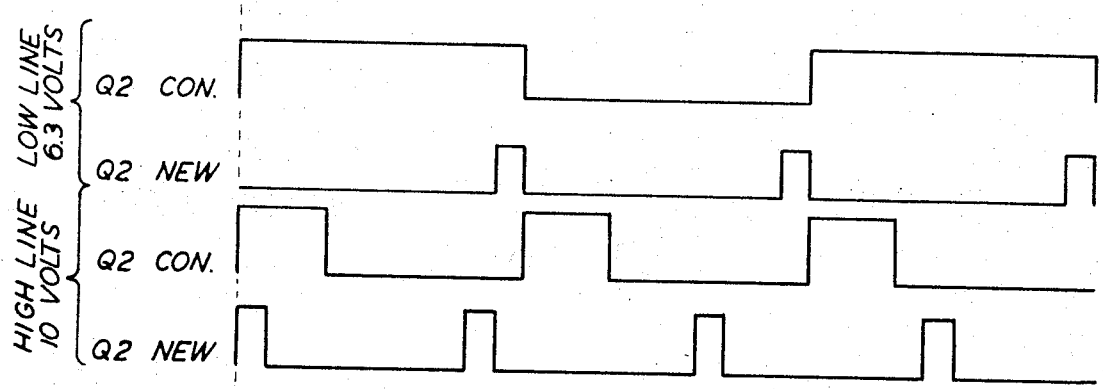
FIG. 9 is another series of waveforms useful in comparing the operation and regulation of the embodiment illustrated in FIG. 2 and the conventional circuit illustrated in FIG. 5.
Figure 8:
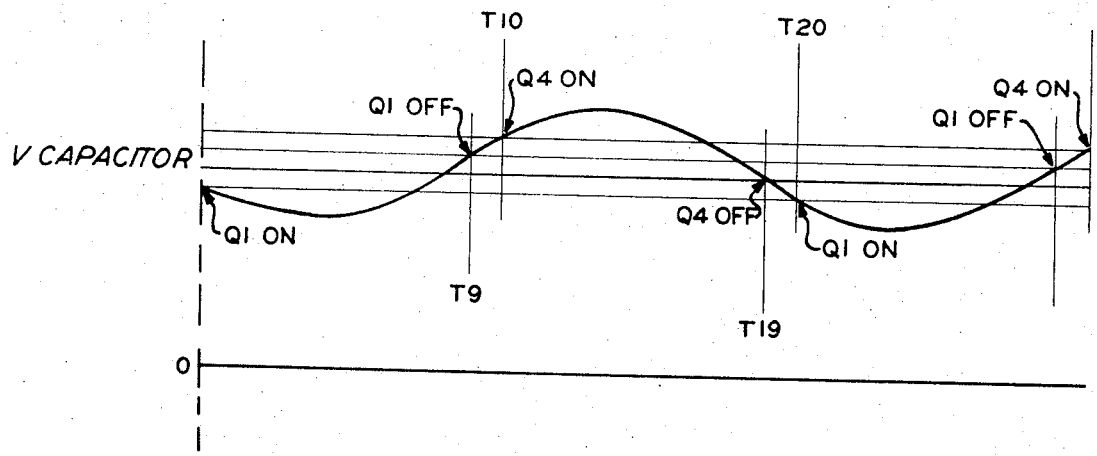

The advantages achieved by virtue of this switching amplifier circuit 4 in combination with the rest of the system is explained as follows particularly in comparison with the conventional regulator, by referring to the waveforms shown in FIGS. 6 through 8. As the output voltage increases across the load circuit in the circuit illustrated in FIG. 2, during the time interval between time T9 and T10, and therefore across the output voltage detection circuit 5, it is fed back over line H, as explained previously, through feedback resistor R4 to the base of transistor Q1, driving transistor Q1 OFF, which during this time interval transistor Q1 controls transistor Q3 and turns it ON which results in series transistor Q2 being switched ON thereby initiating the power stroke. However, as the output voltage increases, the power stroke is initiated at an earlier time, for example at time T9 instead of at time T10 as in the conventional regulator illustrated in FIG. 5. Furthermore, as the output voltage decreases, the power stroke is again initiated at an earlier time, for example at time T19 instead of at time T20 as in the conventional regulator This circuit therefore is capable of better regulation of the output load voltage than the conventional regulator. This is because in the conventional regulator there is no control over the magnitude of the hysteresis due to the use of one transistor, Q4, outside of the systems gain, whereas in this invention the magnitude of the hysteresis can be significantly reduced by the utilization of two transistors, Q4 and Q1. Thus, for example in the conventional circuit the hysteresis is 0.1 volts (i.e., 5.40 to 5.30 volts) whereas in our invention it is approximately one-half that, 5.35 to 5.30. This decreased hysteresis of course improves the regulation of the circuit and in this example by about a factor of two. Furthermore, the frequency of this switching regulator changes about 30 percent (i.e., from 15 to 19 kilocycles) when the input line voltage is increased from about 6.3 to 10 volts, whereas in the conventional Schmitt trigger regulating circuit such as that shown in FIG. 3, there would be about a 100 percent change in frequency (i.e., 15 to 25 kilocycles). This is graphically illustrated in FIG. 9, the phasing between the conventional and new circuit not necessarily being to scale. This decreased frequency variation of the power switching transistor Q2 as the line voltage increases provides increased efficiency or reduction of loss due to the reduced frequency; that is, the switching frequency of transistor Q2 and diode CR2 is reduced.

Additional advantages in the inventive circuit are the use of solid state battery cut-off circuitry as well as automatic reset.

Obviously many modifications and variations of the present invention are possible in light of the above teachings. It is therefore to be understood that within the scope of the appended claims the invention may be practiced otherwise than specifically described.

What is claimed is:

1. An electrical power supply comprising:
   first coupling means for coupling a direct current input voltage source;
   Schmitt trigger amplifier means having an input terminal, an output terminal, and a first and second control terminal, said input terminal coupled to said first coupling means;
   a switching amplifier means, having at least one control terminal and an output terminal coupled to said first control terminal of said Schmitt trigger amplifier;
   output voltage detector means having an input terminal coupled to the output terminal of said Schmitt trigger amplifier, and an output terminal coupled to the second control terminal of said Schmitt trigger amplifier and said switching amplifier's control terminal.

2. An electric power supply according to claim 1 additionally comprising:
   an input voltage detector means having an input coupled to said first coupling means and whose output is coupled to said control terminal of said switching amplifier means.

3. An electric power supply according to claim 1 wherein said switching amplifier means comprises an electron valve means having a control electrode, and a first and second bias means coupled to said control electrode.

4. An electric power supply according to claim 3 wherein said electron valve means includes a transistor having a base electrode, and wherein each of said bias means includes a resistor, and wherein one end of each said resistor is coupled to said first coupling means and wherein the other end of one of said resistors is coupled to said base electrode.

5. An electric power supply according to claim 2 wherein:
   said switching amplifier means includes a transistor having a base electrode and a first and second bias resistor, one end of said first bias resistor coupled to said base electrode and the other end coupled to one end of said second resistor to form a first junction; and wherein said
   input voltage detector means comprises a voltage reference source coupled in series at said first junction with said second bias resistor.

6. An electric power supply according to claim 2 wherein said input voltage detector means
   causes said switching amplifier means to operate in its regulating mode when the input voltage at the first coupling means exceeds a first predetermined value.

7. An electric power supply according to claim 6 wherein said input voltage detector means further causes, in its undervoltage protection mode, said switching amplifier means to assume a first condition when the input source voltage at the first coupling means is below said first predetermined value.

8. An electric power supply according to claim 1 wherein said switching smplifier means, in its regulating mode, assumes a second condition when the output voltage at the output terminal goes above a second predetermined value, and assumes a first condition when the output voltage at the output terminal goes below said second predetermined value.

9. An electric power supply according to claim 8, wherein said Schmitt trigger amplifier means includes a first and second triggering means connected to said first and second control terminals respectively and a switching means coupled to the input terminal, and, in its regulating mode, said second triggering means assumes a first condition when the output terminal goes above a third predetermined value and assumes a second condition when the output terminal goes below said third value, and wherein said switching means assumes a first condition when both said switching amplifier means and said second triggering means are in a second condition.

10. An electrical power supply comprising:
    first coupling means for coupling a direct current input voltage source;
    second coupling means for coupling a load;
    Schmitt trigger regulator means having an input and output triggering stage, an input terminal, an output terminal, a series switching means coupled between said terminals, and a first and second control terminal, coupled to said load, said input terminal coupled to said first coupling means and said output terminal coupled to said second coupling means;
    a switching means, having at least one control terminal one of which is coupled to said load and an output terminal coupled to said first control terminal of said Schmitt trigger regulator, for inhibiting said series switching means from conducting when said switching means is in a first state and enabling said series switching means to conduct when said output triggering stage is in a second state.

* * * * *